United States Patent
Mohatt et al.

[11] Patent Number: 5,898,718
[45] Date of Patent: Apr. 27, 1999

[54] METHOD AND APPARATUS FOR OPTIMIZING THE OUTPUT OF A MULTI-PEAKED FREQUENCY HARMONIC GENERATOR

[75] Inventors: Dennis J. Mohatt, Wyoming; Noureddine Melikechi, Dover; Robert S. Tamosaitis, Hockessin, all of Del.

[73] Assignee: Altos Inc., Hockessin, Del.

[21] Appl. No.: 08/858,713

[22] Filed: May 19, 1997

[51] Int. Cl.⁶ .................... H01S 3/10; G02F 1/35
[52] U.S. Cl. .................... 372/22; 372/20; 372/21; 372/34; 359/326; 359/328
[58] Field of Search .................... 372/20, 21, 22, 372/23, 34, 36, 109; 359/326, 328; 385/14, 129, 130

[56] References Cited

U.S. PATENT DOCUMENTS

| | | | |
|---|---|---|---|
| 3,949,323 | 4/1976 | Bierlein et al. | 372/22 X |
| 4,019,159 | 4/1977 | Hon et al. | 372/22 X |
| 4,913,533 | 4/1990 | Kafka et al. | 372/22 X |
| 4,953,931 | 9/1990 | Miyazaki et al. | 372/22 X |
| 4,953,943 | 9/1990 | Miyazaki et al. | 372/22 X |
| 5,022,729 | 6/1991 | Tamada et al. | 385/14 X |
| 5,068,546 | 11/1991 | Hemmerich et al. | 359/328 |
| 5,168,503 | 12/1992 | Maeda | 372/22 |
| 5,185,752 | 2/1993 | Welch et al. | 372/22 |
| 5,253,259 | 10/1993 | Yamamoto et al. | 372/22 |
| 5,365,366 | 11/1994 | Kafka et al. | 372/22 X |
| 5,377,212 | 12/1994 | Tatsuno et al. | 372/22 |
| 5,495,489 | 2/1996 | Lee et al. | 372/34 |
| 5,544,271 | 8/1996 | Lim | 385/122 |
| 5,546,220 | 8/1996 | Endo et al. | 359/332 |
| 5,559,824 | 9/1996 | Baird et al. | 372/95 |
| 5,671,232 | 9/1997 | Lee et al. | 372/22 |
| 5,682,398 | 10/1997 | Gupta | 372/22 |
| 5,761,226 | 6/1998 | Gupta | 372/22 |

*Primary Examiner*—Brian Healy
*Attorney, Agent, or Firm*—Robert J. Reichert

[57] ABSTRACT

A method and devices for obtaining optimized output harmonic frequency light at a plurality of peak frequencies from a nonlinear ferroelectric generator optical device by controlling the overall temperature of sections along the length of the optical structure and differentially applying external energy to the sections, with greater energy input near the input end than near the output end each section.

8 Claims, 3 Drawing Sheets

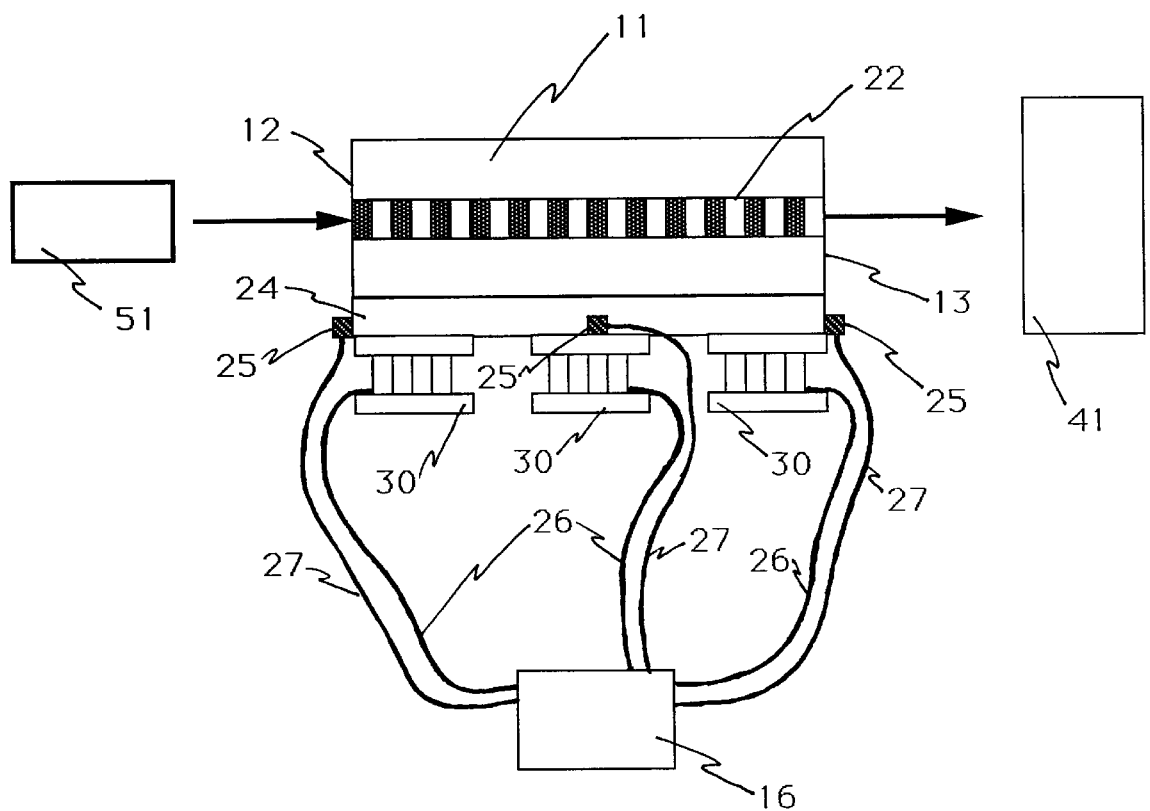

METHOD AND APPARATUS FOR OPTIMIZING THE OUTPUT OF A MULTI-PEAKED FREQUENCY HARMONIC GENERATOR

FIELD OF THE INVENTION

The present invention relates to methods and apparatus for optimizing the output and controllability of nonlinear harmonic generators that receive light of a plurality at a plurality of primary frequencies and emits light at a plurality of frequencies that are harmonic frequencies of the primary frequencies.

BACKGROUND OF THE INVENTION

Bierlein U.S. Pat. No. 3,949,323 discloses the preparation of crystals, such as $KTiO(PO_4)$ crystals (KTP crystals), that are useful as second harmonic generators (SHG).

Miyazuka et al. U.S. Pat. Nos. 4,953,931 and 4,953,943 describe nonlinear devices having a $LiNbO_3$ thin film waveguide layer formed on $LiTaO_3$ substrate.

Tamada et al. U.S. Pat. No. 5,022,729 discloses a SHG having a $Ta_2O_3TiO_2$ system amorphous thin film optical waveguide on a substrate. The substrate may be a nonlinear optical crystal material. The waveguide can be made more effective by forming periodically poled regions of selected period and depth in the nonlinear substrate.

Yamamoto et al. U.S. Pat. No. 4,591,291 discloses a semiconductor laser and an optical nonlinear device positioned on a submount with the laser's active layer and the nonlinear device's surface waveguide facing the submount so that the fundamental light from the laser is directly applied to the nonlinear device and doubled in frequency producing a visible light.

Yamamota et al. U.S. Pat. No. 5,253,259 discloses a frequency doubler comprising a nonlinear crystal having domain inverted regions and a waveguide coupled to a semiconductor diode laser. The device includes a means for heating the frequency doubler to tune it to the desired frequency regardless of the ambient temperature.

Endo et al. U.S. Pat. No. 5,546,220 discloses an optical structure that is clad with a metal coating to conduct electricity and uniformly heat an optical structure to tune it.

Welch U.S. Pat. No. 5,185,752 discloses a diode laser having a reflective back end coupled to a SHG. The SHG comprises a periodically poled waveguide having ferroelectric domains and a periodic reflector, particularly a distributed Bragg reflector (DBR) grating. This arrangement forms an optically resonant chamber feedback system that stabilizes the frequency output of the diode laser and efficiently couples the diode laser to the SHG.

By the techniques described above, and numerous others, significant improvement has been made in the efficiency, in terms of power output, currently being obtained from laser/SHG systems. Nevertheless, the efficiencies obtainable by the currently available devices are still very low. There is a need for achieving far greater efficiency, and so output power, because higher power laser/SHG units would be useful in a number of areas where current devices are unsatisfactory, such as optical data storage, remote sensing, and therapeutic medical applications. Practicing the present invention, using a KTP crystal optical structure, increases the output power from 2–5 times that from a similar KTP optical structure used in accordance with the prior art. Also the narrower wavelength of the output light from the devices of the present invention makes them more accurate in devices for detecting specific materials, avoiding false readings and making it unnecessary to have expensive devices to avoid false readings.

It has been observed that the second harmonic efficiency of nonlinear harmonic generator crystals of identical dimensions and apparent compositions often have different second harmonic generation efficiencies. It is also believed that various locations along the length of a single crystal may have different generation efficiencies. Also it has been observed that during second harmonic generation the generator tends to heat differentially along the length of the generator, with the greatest heating occurring in the zone near the output end of he generator. Additionally it has been observed that the internal conversion efficiencies of longer crystal generators tends to be less than for shorter length generators.

The method of the present invention increases the internal conversion efficiency of nonlinear optical structures.

SUMMARY OF THE INVENTION

The present invention relates to a device that emits light comprising a nonlinear harmonic generator optical structure that receives light of a plurality of primary frequencies at an input end thereof and emits at an output end thereof light of a plurality of second frequencies that are harmonics of primary frequencies, and at least two heat exchange means, each of which is adapted to exchange thermal energy between the heat exchange means and a section of the optical structure. Each heat exchange means is also independently controllable, so that more thermal energy is applied near the input end of each such section than near the output end of each such section of the optical structure.

The present invention also relates to the method of obtaining and optimizing output light at a plurality of harmonic frequencies from a nonlinear optical structure comprising introducing light at a plurality of primary frequencies into an input end of the optical structure; applying heat to a first section of the optical structure and modifying the application of heat to obtain output light at a desired first harmonic frequency, applying heat differentially along the length of the first section at a plurality of separate locations, with more heat being applied near the input end than near the output end of the first section of the optical structure to optimize the first desired harmonic light output; applying heat to a second section of said optical structure and modifying the application of heat to obtain output harmonic light at a desired second harmonic frequency; and applying heat differentially along the length of the second section of the optical structure, with more heat being applied near the input end than near the output end of the second section to optimize the output of harmonic light at the desired second frequency. The first and second desired harmonic lights can be obtained simultaneously or sequentially one at a time.

BRIEF DESCRIPTION OF THE DRAWINGS

FIG. 3 is a present invention device having three heat exchange means along the length of the optical structure.

DEFINITIONS

Figure 1:
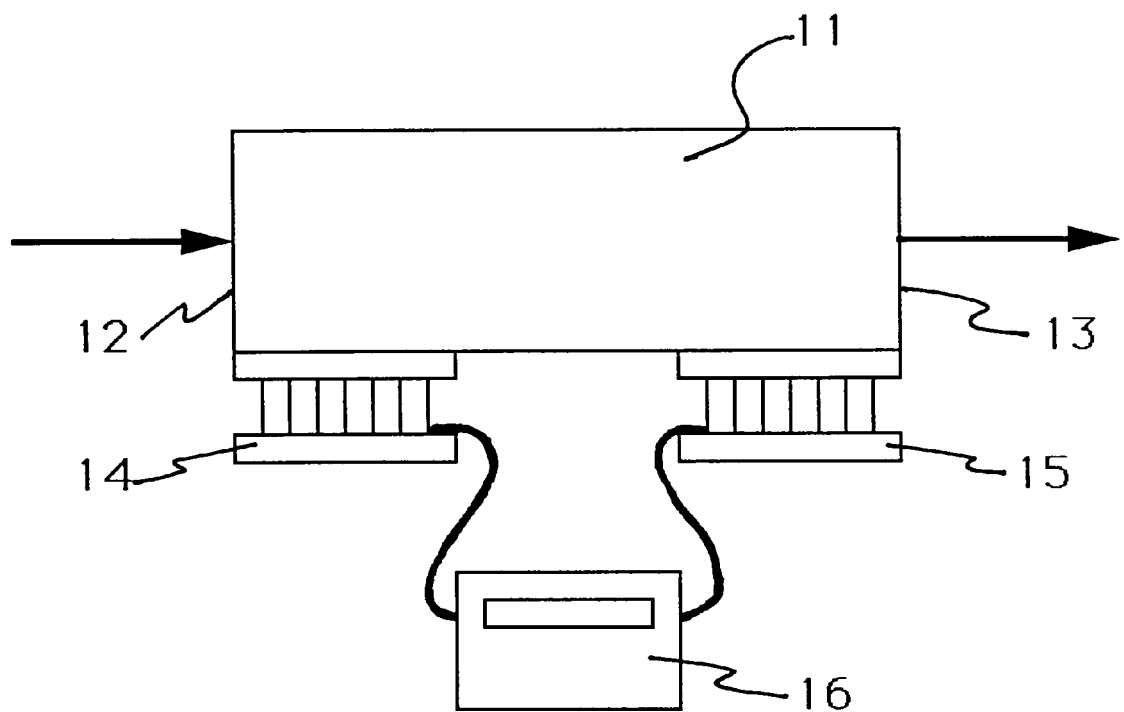
FIG. 1 is a schematic of a simple embodiment of the present invention device.

Definitions of some terms, as used herein, are as follows:

"Light" means electromagnetic radiation of any wavelength. "Light" can be of constant intensity, modulating intensity, or pulsed.

"Primary frequency" means the frequency of the input fundamental light beam that produces the desired harmonic frequency output frequencies.

"Higher" harmonics frequencies means a numerical multiple of the fundamental frequency, as an example the second harmonic is double the frequency of the input fundamental light beam.

"Sections", when referring to the optical structure, means, separate, specific independent zones along the length of the optical structure. Sections have no borders, and to some extent separate sections may overlap. A section "near the input end" is readily distinguishable from a section "near the output end", although in a small optical structure these two sections might be adjacent to each other with no clear border between. In some situations the term "section" refers to the entire optical structure, in which cases the terms "first section" and "second section" both refer to the entire optical structure (always true?)

"Heat exchange" means the flow of thermal energy between two locations.

"Applying heat" and "applying thermal energy" mean transferring heat or thermal energy to some location. The terms "applying external energy (or heat) at a greater rate", "greater application of energy (or heat)", and "applying more energy (or heat)", when used in reference to energy transfer to or from the optical structure, are used to define net energy transfer. These terms include removing thermal energy as well as adding thermal energy, i.e. heating to add heat and cooling to remove heat from the optical structure. Thus the term "applying more thermal energy or heat near the input end than near the output end of the optical structure" includes the application of more energy, i.e. heat, to segments located near the input end than to segments located near the output end of the optical structure; it also includes removing less energy (i.e. cooling) from segments near the input end than from segments near the output end of the optical structure; and it also includes heating near the input end while cooling near the output end.

"Optimizing", as used in describing the desired output light includes not only maximizing the output power, but also includes producing the same output power while minimizing the required input power, i.e. using a lower power less expensive diode laser, and also improving the spectral quality.

"Near the end of the optical structure" means near the end of that part of the overall optical structure that generates harmonics. For example, if the optical structure has a Bragg reflector along it's length at one end, the term "near the end of the optical structure", referring to the Bragg reflector end, means near that section of the optical structure that terminates where the Bragg reflector begins, since the Bragg reflector section usually does not generate harmonic light.

The term "plurality" when referring to light frequencies means more than one frequency, which can occur simultaneously or sequentially. When used in referring to sections of an optical structure, "plurality" means more than one at the same time (simultaneously), and also includes only a single section when used sequentially more than one time.

The term "substantially different" means that the difference is sufficient to have a negative impact on performance and/or utility. The term "substantially the same" means that the difference is insufficient to have a negative impact on performance or use.

The term "spectral quality" as used in describing a light includes the characteristics of frequency bandwidth, mode structure (what's this mean), and the shape of the power versus frequency graph.

The term "peak harmonic frequency" as used in reference to the output light means a frequency of major output power.

The term "overall temperature" when used in reference to an optical structure means the operational temperature before application of differential heating.

DETAILED DESCRIPTION OF THE PRESENT INVENTION

The principle of the present invention is the discovery that by controlling the heat distribution of an optical device having independently controllable heat exchange means at a plurality of locations along the length of the optical structure, it is possible to generate output light at a plurality of peak harmonic frequencies and optimize each peak harmonic frequency output and/or control the spectral quality of each peak. The individual harmonic frequency outputs can be generated simultaneously or sequentially.

In the practice of the method of the present invention, the application of heat to the optical structure is done in two phases. In the first heating phase, a first section of the optical structure, which may be the entire optical structure, is heated to the appropriate overall temperature for the optical structure to produce the first desired harmonic frequency output light. Then in the second phase of the application of heat, this section of the optical structure is heated differentially along its length, with more heat applied near the input end of the section that is applied near the output end of the section. This differential heating is adjusted to optimize the output of the first desired harmonic frequency light.

To obtain the desired second harmonic frequency output light, a second section of the optical structure is heated overall to the temperature that enables the optical structure to produce the desired second harmonic frequency output light. Then the second section is heated differentially along its length, with more heat applied near the input end of the section than is applied near the output end of the section and the differential heating is adjusted to optimize the second desired harmonic frequency output light.

If the first and second heated sections are the same section, such as the entire optical structure, the first and second desired harmonic frequency output lights are produced sequentially, each output light being optimized sequentially by adjusting the differential heating after the overall temperature of the optical structure has been fixed to produce the desired peak frequency output light. If the first and second sections are different locations along the length of the optical structure, and the two phases of heat controlling are done simultaneously on both sections with the overall temperatures of each section being different, output light with the two desired optical peak harmonic frequencies optimized will be produced simultaneously.

To produce output light having a plurality of desired harmonic frequencies, it is necessary to have the input light at a plurality of frequencies that are appropriate for producing the desired output harmonic frequencies. The plurality of frequencies can be supplied simultaneously from a single input laser light that has a wide band of input frequencies. Alternatively the plurality of input light frequencies can be supplied sequentially from a narrow frequency band input laser light, the frequency of which can be adjusted such as by adjusting the operating temperature of the laser.

The devices of the present invention for producing light at a plurality of harmonic frequencies comprise a nonlinear harmonic optical structure that receives coherent light of a plurality of primary frequencies at an input end thereof and emits light at an output end thereof that is a harmonic of more than one of the primary frequencies; and a plurality of external independently controllable heat exchange means located adjacent to the optical structure. The heat exchange means are structured to independently control the overall temperature of sections of the optical structure along the length of the optical structure, and also to independently control the energy exchange applied to the individual segments. The heat exchange means are therefore structured to independently set and maintain upon command the segments of the optical structure at the appropriate overall temperature to generate light at the desired harmonic frequencies of one of said primary light frequencies, and to apply more heat near the input end than to the output end of each section to optimize the output power of harmonic frequency generated by each section.

The segments may be a single segment, such as the entire optical structure. In such a device the heat exchange means are structured to maintain the segment sequentially at a plurality of appropriate overall temperatures and to optimize the power output of harmonic generated at each overall temperature. Such a device sequentially generates light at the desired plurality of harmonic frequencies.

Alternatively, the segments may be separate distinct segments, each of which is a distinct harmonic frequency generating zone. Such an optical device has an optical structure that is divided into two or more distinct harmonic generating sections, an input end generating section, an output end generating section and, if desired, one or more intermediate generating sections along the length of the optical structure. In such a device the heat exchange means are structured to maintain each section at an appropriate overall temperature to generate and to optimize one of the desired harmonic frequency outputs.

In each of these devices the heat exchange means are structured to tune each section by applying more heat near the input end than near the output end of each section to optimize the output light produced by that section.

Referring to FIG. 1, a simple form of the preferred device of the present invention comprises a nonlinear harmonic generator optical structure 11, such as a bulk KTP crystal of the type disclosed in Bierlein U.S. Pat. No. 3,949,323, or KTP waveguide of a type disclosed in Bierlein U.S. Pat. No. 5,028,107. Optical structure 11 is capable of receiving an input light of a plurality of primary frequencies into an input end 12 and converting part of the primary frequency light to output light to any harmonics of the primary frequencies input light, along with unconverted primary frequency light. The plurality of harmonic frequency lights are emitted from the output end 13 of the optical structure.

To practice the method of the present invention using the device of FIG. 1, at least two heat exchange means at different locations along the length of the optical structure are required. FIG. 1 shows two heat exchangers 14 and 15, positioned adjacent to and along the length of the optical structure 11, heat exchanger 14 to heat the section of the optical structure near input end 12 and heat exchanger 15 to heat the section of optical structure 11 near the output 13. Heat exchangers 14 and 15 must be independently controllable so that each can apply (or remove) heat at the appropriate rates to these two separate sections along the length of optical structure 11, more heat being applied near the input end 12 than near the output end 13 of optical structure 11. Heat exchange controller 16 regulates the heat applied by each heat exchanger 14 and 15. Heat exchange controller 16 also monitors the temperatures at the interfaces between optical structure 11 and heat exchangers 14 and 15. The power of the output light emitted from optical structure 11 is monitored by separate instrumentation which is commercially available. Heat exchange controller 16 is adjustable, in response to the power output, to apply the appropriate heat inputs to optical structure 11 by heat exchangers 14 and 15 to obtain maximum power output (efficiency) from optical structure 11.

The device of FIG. 1, having only two heat exchange locations along the length of the optical structure, can be used in practicing the method of the present invention to obtain sequentially a plurality of harmonic frequency output lights. This is done by first setting the overall temperature of the optical structure by adjusting both heat exchangers 14 and 15 so that the optical structure produces the first desired harmonic frequency. Then, while monitoring the power output, this frequency output is optimized by modifying the heat applied by each of these heat exchanger until maximum power output is obtained. When this is achieved, more heat will be applied by heat exchanger 14 near the input end of this section of the optical structure (the entire optical structure) than is applied by heat exchanger 15 near the output end of this section. To obtain the second desired harmonic frequency output, the overall temperature is reset, by adjusting heat exchangers, so that the optical structure is producing the second desired harmonic frequency output. This output is optimized by adjusting heat exchangers 14 and 15.

When using the device of FIG. 1, for obtaining maximum power for each of the desired frequency sequential outputs, heat exchanger 14 applies more heat to optical structure 11 than heat exchanger 15 during each of the output sequences. In an optical structure having substantial uniform birefringence index along its entire length, the difference in heat energy introduced by heat exchangers 14 and 15 will be substantially equal to the difference between the amount of heat generated near the input end 12 and the output end 13 of the optical structure 11 by the conversion of the input light to the higher harmonic frequency light in optical structure 11.

In a device for obtaining sequential peak harmonic frequency outputs, when using an optical structure having a waveguide, the two heat application locations shown in FIG. 1 is particularly suitable, because optical structures having a waveguide have the ability to generate harmonics along the length of the waveguide. However, when using a bulk crystal optical structure as the optical structure in a sequential multi-peak output device like FIG. 1, for optimizing the output light it is desirable to also have a heat exchange means located near the middle segment of the crystal. Normally this heat exchange means will apply to the optical structure less heat than is applied to any other section, because the middle segment tends to be heated more than the ends by the harmonic generation. On the other hand, optical structures that have a waveguide and also a Bragg reflector at the output end of the optical structure perform best with a heat exchange means located adjacent the reflector to independently control the application of heat to the Bragg reflector, and also a heat exchange means upstream (toward the input end of the optical structure) from the Bragg reflector, nearer the middle of the optical structure, that applies heat to that harmonic generating section of the waveguide upstream from the Bragg reflector. Such a device is otherwise operated above described in the practice of the present invention.

Figure 2:
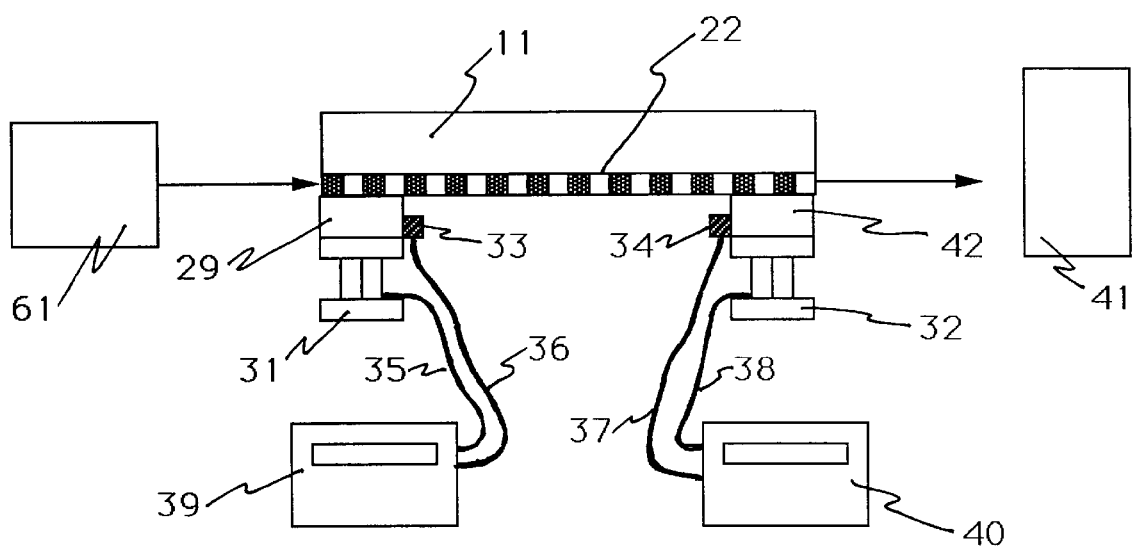
FIG. 2 is a present invention device having heat exchange means near the input end and near the output end of the optical structure, wherein the optical structure is comprised of a waveguide, along with heat exchange controllers.

FIG. 2 is a detailed drawing of a device of the type schematically shown in FIG. 1. In FIG. 2 optical structure 11 has a waveguide 22 positioned in direct contact with two aluminum heat conducting aluminum blocks 29 near the input end 12 of optical structure 11 and 42 near output end 13. A Ti-sapphire laser (Spectra Physics Model 3900) directs light of a first frequency into waveguide 22. Harmonic light and unconverted light of the first frequency is emitted through output end 13 to power meter 41, which monitors the output power at the various output frequencies. Adjacent aluminum blocks 29 and 42 are Peltier TEC heat exchangers 31 near input end 12 and 32 near output end 13 of optical structure 11. Thermister temperature sensors 33 and 34 detect the temperature of aluminum blocks 29 and 42 respectively, and feed this information through wires (sets of two wires) 36 and 37 to heat exchange controllers 39 and 40. Heat exchangers 31 and 32 are connected to controllers 39 and 40, respectively, by wires (two wire sets) 35 and 38. Controllers 39 and 40 are independently controllable; they are used to set the overall temperature of optical structure 11 to produce the desired frequency harmonic output light, and to optimize this output light.

Referring to FIG. 3, this device has three thermister heat exchangers 30 located along the length of optical structure 11. These are adjacent heat conducting aluminum plate 24, to differentially control the application of heat to optical structure 11 at the three locations. Each heat exchanger 25 is connected to heat exchange controller 16 by wires 26. The temperature of aluminum plate 24 is detected by temperature sensors 25 and fed back to monitor 16 through wires 27. Input light, generated by laser 51, is directed into optical structure 11 at input end 12; output light is emitted at output end 13, which is monitored by power meter 41. Optical structure 11 has a waveguide 22.

This device of FIG. 3 can also be used for obtaining sequential desired output light of differing peak frequencies. However, this device is particularly suited for simultaneously producing output light having two optimized desired harmonic frequency peaks. This is done by adjusting the input end and middle heat exchangers to set the segment at the input end of optical structure 11 at the overall temperature that produces the first desired harmonic frequency and then optimizing its output, shown by a peak output on monitor 16. Then by adjusting the output end heat exchanger 30 the segment at the output end of optical structure 11 is set at the temperature that produces the desired second harmonic frequency output.

Since the device of FIG. 2 has only three heat exchangers, the middle heat exchanger will be applying less heat than the input end heat exchange, and the output end heat exchanger will be applying less heat than the middle heat exchanger. Therefore the output segment of the optical structure will be operating at a lower overall temperature than the input segment, producing a second desired peak output harmonic frequency that is of lower frequency than the first desired harmonic frequency output generated by the input end segment of the optical structure. To have greater flexibility in producing two peak out frequency harmonics, it is often desired to have four independently controlled heat exchangers, two to modify the temperature of each separate segment of the optical structure. Six heat exchangers, controlling three separate segments of the optical structure, are preferred when producing output harmonic light having three desired peak frequencies.

The optical structures used in the devices of the present invention can be any of the prior art optical devices, exemplified by those in the above mentioned patents. They are made by conventional techniques; many such optical structures are commercially available. Also a number of suitable bulk crystal optical structures, and optical structures with various types of waveguides and reflectors, are commercially available. The preferred optical structures are crystals of KTP, $LiNbO_3$, and $LiTaO_3$. As a generalization any nonlinear optical structure, preferably a ferroelectric crystal, that is suitable for use as a harmonic generator can be used in the devices of the present invention.

Any suitable heating and/or cooling exchange means can be used in the devices of the present invention. They must be capable of controllable heating and/or cooling the specific section of the optical structure. At least two independently controllable heat exchange means are used, preferably thermoelectric or resistive heat transfer elements. Independently controlled heat exchange means are usually positioned near the input end and near the output ends of the optical structure. In devices that have a Bragg reflector, it may be desirable to have a separately controlled heat exchange means that can exchange thermal energy with the Bragg reflector, thereby heating or cooling it as necessary to obtain the desired Bragg operating frequency.

The preferred heat exchange units are thermoelectric devices that can effect thermal energy flow in and out of the optical structures. Preferably these are affixed onto the face of the optical structure that is nearest to the light path through the optical structure. Thus if the optical structure has a waveguide adjacent to one surface of the optical structure, the preferred positioning of the heat exchangers is adjacent to the waveguide surface.

To control the differential heat transfer along the length of the optical structure by the heat exchange units, any control means can be used that is capable of reaction to the temperature at the areas of heat transfer and that is capable of independently modifying the heat transfer by each heat exchange unit in response to an automatic or operator's command. If the optical structure is to be tuned to produce the desired output frequency, either the heater controllers or some other means must be capable of modifying the overall temperature of the optical structure to produce the desired output harmonic frequencies. A useful preferred range of input light wavelengths is from about 400 nm to 10,000 nm.

Absolute maximum efficiency of the devices of the present invention require nonlinear and changeable heating along the length of the optical structure because the harmonic generation process is nonlinear, generating nonlinearly amounts of absorbed energy from the harmonic generation increasing toward the output end of the optical structure. In addition, manufactured irregularities in properties of the optical structure, irregularities between apparently similar crystals, irregularities introduced by etching, and by use can also result in not linear conditions. Consequently no specific predetermined setting for the applications of heat transfer will be the optimum efficiency settings between energy inputs at the various locations along the length of the optical structure. Consequently the optimum heat transfer settings are not completely predictable, and must be optimized by trial that is well within the skill of an operator or automated controller, using the output power as the reference, and are likely to require resetting as changes are induced in the optical structure due to use.

The practice of the invention will become further apparent from the following non-limiting Examples.

EXAMPLE 1

The device of FIG. 2 is used to sequentially produce two desired harmonic frequency output lights. To produce the first desired harmonic frequency output light, the optical structure is operated at room temperature of 21° C. The optical structure is a nonlinear KTP waveguide harmonic generator optical structure 6.77 mm in length, 2.35 mm in width, and 0.77 mm in thickness. This optical structure has a periodic waveguide and is thermally controlled by two "Peltier" TEC thermoelectric coolers (MELCOR FC0.7-18-05L), one applying heat to the segment of the optical structure near the input end and the other applying heat to the segment near the output end of the optical structure. The TECs are affixed with cyanoacylate (super glue) to two conductive thin aluminum plate 4.0 mm long, 6.0 mm wide and 0.8 mm thick located under the input and output ends of the optical structure. Temperature sensor YSI model #44016 thermisters are affixed inside each aluminum plate with :Lucite: delta bond thermally conductive adhesive. The thermisters are connected by wires to two independent ILXLDT model 5910 manually adjustable temperature controllers that show the temperatures at the end interfaces of the aluminum plates with the optical structure. The optical structure is placed (not glued) on top of the two aluminum plates. Initially each TEC is set at 21° C. by the heater controller connected to each TEC. The input light, directed to optical structure, is supplied by a titanium sapphire laser that scans a predetermined range of wavelengths from 849 nm to 854 nm with a power input of 48 mW.

The device is activated and after it has reached stable conditions, the output light is analyzed by a United Detector Technology power meter model 390 (UDT 390) calibrated in accordance with standards set forth by the National Institute of Standards and Technology (NIST) and a Burleigh wavemeter model WA-2000. This initial output light has its major peak wavelength at 425.76 nm, the first desired harmonic frequency output light. The heat being applied near the two ends of the optical structure by the two TECs is then adjusted to give the maximum power output of this harmonic frequency light, with more heat being applied to the optical structure by the TEC near the input end of the optical structure than is applied by the TEC near the output end of the optical structure.

To obtain the second desired harmonic frequency output light, having its major peak wavelength at 426.16 nm, the two heater controllers are used to set the overall temperature (define) of the optical structure at approximately 31° C. While monitoring the output power, the heat being applied to the two segments of the optical structure by the two TECs are adjusted to give maximum power output of this second desired harmonic frequency output light, which is at a power level approximately the same as the optimized output level of the first desired harmonic frequency light. Again the heat applied near the input end of the optical structure is greater than the heat applied near the output end.

The device of this Example, producing two sequential desired harmonic frequency outputs, is used in laser spectroscopy equipment and other measurement equipment.

EXAMPLE 2

This Example uses a device similar to the device of FIG. 2, the only difference being that the optical structure is heated by four TEC heaters, one at each end and two near the middle of the optical structure. The optical structure is the same type KTP crystal with a waveguide as in Example 1, except that the optical structure is 11 mm in length. It rests on four aluminum plates identical to those of Example 1, each of which is hooked up to individual temperature controllers of the type described in Example 1. The four TECs are identical to those described in Example 1. Thus the optical structure is divided into two segments, one extend from the input end to almost the middle of the optical structure and the second segment extending from just past the middle to the output end of the optical structure. Each segment has independently controllable heat exchange means located to apply heat near the input and near the output end of the segment. The same Ti-sapphire laser is used to produce the input light, and the same output power meter is used as in Example 1.

The device is activated and after it has reached stable conditions, the overall temperature of the segment near the input end of the optical structure is set at 21° C. The output light is analyzed by the power meter. This output light has it's major power peak at 426.76 nm wavelength. The power of this first desired harmonic frequency output is then maximized by adjusting the heat being applied at each end of this segment by the TECs located near the input and output ends of this segment of the optical structure.

To obtain a second desired harmonic frequency peak power output, the overall temperature of the second segment of the optical structure, located from the middle to the output end of the optical structure, is then set at about 41° C. At this temperature the optical structure emits a second major peak harmonic light having a wavelength of 427.56 nm. The power of this second harmonic output is then maximized by adjusting the heat being applied by the TECs located near the input and output end of this segment of the waveguide. At this time the optical structure is simultaneously emitting output light having two peak output wavelengths, one at 426.76 nm and a second at 427.56 nm, both of which are at about the same power level.

This device is useful in laser spectroscopy equipment.

Particular embodiments of the invention are included in the examples. Other embodiments will become apparent to those skilled in the art from a consideration of the specification or practice of the invention disclosed herein. It is understood that modifications and variations may be practiced without departing from the spirit and scope of the novel concept of this invention. It is further understood that the invention is not confined to the particular modifications and examples herein illustrated, but it embraces such modified forms thereof as come within the scope of the claims.

What is claimed:

1. The method of obtaining output light at a plurality of desired peak harmonic frequencies from a nonlinear optical structure comprising:
   a) introducing light of a plurality of primary frequencies into an input end of said optical structure;
   b) applying heat to a first segment of said optical structure and modifying said applying heat to obtain output light at a desired first harmonic frequency;
   c) applying heat differentially along the length of said first segment of said optical structure, with more heat being applied near the input end than near the output end of said first segment, to optimize said output light at the desired first harmonic frequency;
   d) applying heat to a second segment of said optical structure and modifying said applying heat to obtain output light at a second desired harmonic frequency; and
   e) applying heat differentially along the length of said second segment of said optical said structure, with more heat being applied near the input end than near the output end of said second segment, to optimize said output light at the desired second harmonic frequency.

2. The method of claim 1 wherein said first and second segments are the same segment, said steps a) and b) are first carried out to produce output light at said first desired harmonic frequency and said steps c) and d) are thereafter carried out to produce output light at said second desired harmonic frequency.

3. The method of claim 1 wherein said first and second segments are separate segments and steps a) through d) are carried out simultaneously.

4. The method of claim 1 wherein said plurality of primary frequencies of said input light are introduced sequentially, the first of said primary frequencies producing the first desired harmonic frequency output and the second of said primary frequencies thereafter producing the second desired harmonic frequency output light.

5. A device for producing light at a plurality of harmonic frequencies comprising: a nonlinear harmonic optical structure that receives coherent light of a plurality of primary frequencies at an input end thereof and emits light at an output end thereof that is a harmonic of more than one of said primary frequencies; and a plurality of external independently controllable heat exchange means located adjacent to said optical structure to control the temperature of segments of said optical structure along the length of said optical structure, said heat exchange means being structured to independently set and maintain upon command said segments of the optical structure at the appropriate overall temperature to generate light at the desired harmonic frequencies of one of said primary light frequencies, and being structured to apply more heat near the input end than to the output end of each said section to optimize the output power of harmonic frequency generated by each said section.

6. The device of claim 5 wherein said segments are a single segment, and said heat exchange means are structured to maintain said segment sequentially at a plurality of appropriate temperatures and to optimize the power output of harmonic lights so as to sequentially generate light at said desired plurality of harmonic frequencies.

7. The device of claim 5 wherein said segments are separate segments, and said heat exchange means are structured to maintain each segment at an appropriate temperature to generate and to optimize one of said desired harmonic frequency output lights.

8. The device of claim 5 comprising a source of laser input light.

* * * * *